United States Patent Office 3,182,750
Patented May 11, 1965

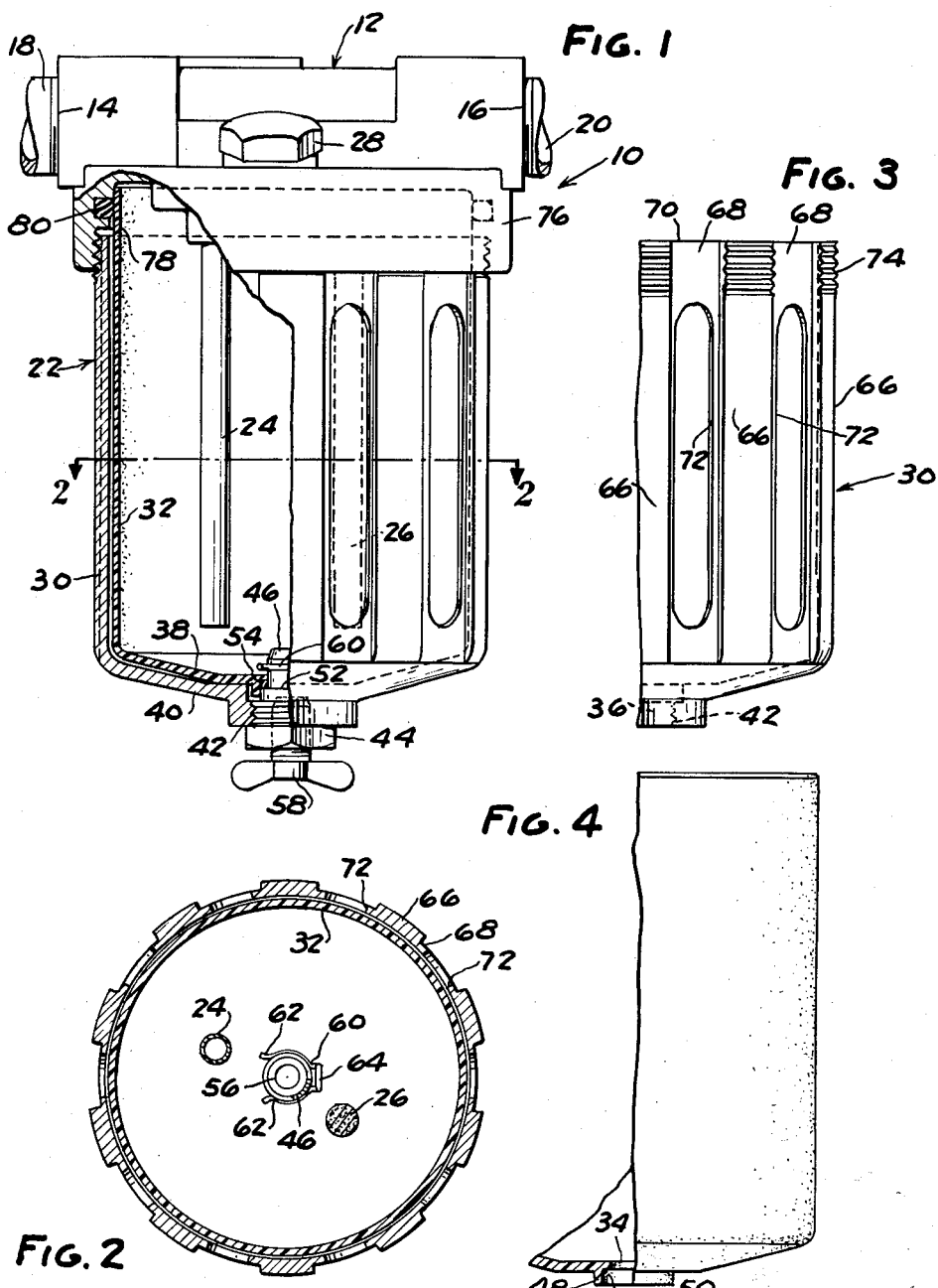

3,182,750
CUP STRUCTURE FOR AIR LINE LUBRICATOR
OR THE LIKE
Quin R. Gleason and Keith A. Boyd, Detroit, Mich.,
assignors to Master Pneumatic, Inc., Detroit, Mich., a
corporation of Michigan
Filed Apr. 30, 1962, Ser. No. 191,014
2 Claims. (Cl. 184—55)

This invention relates generally to air line accessory equipment such as lubricators, filters, and traps which have a head connectible into an air line and a cup attached to the head for containing fluids such as lubricant, trapped water, etc. The interior of the cup is subjected to air line pressure. It is the cup structure which is the subject of this invention, and a lubricator is selected for its illustration.

Conventionally, air line accessory cups have been made of a relatively rigid plastic material such as an acrylic plastic with a thick enough wall to contain of itself the air line pressure within the cup. These cups are relatively brittle and occasionally fail during use, exploding into fragments without any warning indication in advance. For safety purposes, this has necessitated the addition of a metal shield around the cup to contain the fragments, but this arrangement has proven unsatisfactory because of cost. Also, since the shield must be perforated to permit observation of the lubricant level in the cup, it is not entirely effective for containing the explosively propelled fragments. Moreover, the perforations cannot be very large, and this makes visual observation difficult.

In the conventional cup, a brass fitting is sealed directly into a bottom opening in the plastic material for receiving the petcock. Sometimes during manufacture a defective seal is formed between the fitting and the plastic. When this happens, the cup must be discarded since there is no known economical way of perfecting the seal. In use a good seal is sometimes broken when the petcock is screwed tightly into the fitting and here again the cup must be discarded.

The relatively thick wall structure of the conventional cup requires the use of considerable plastic material, making the cup relatively expensive, and at the same time the wall thickness decreases the cup capacity.

The object of this invention is to provide a relatively inexpensive cup structure which is improved to diminish or eliminate entirely the above-discussed deficiencies of the conventional cup.

Generally, the invention contemplates the use of an inner cup made of a tough, flexible plastic material which is relatively thin and of itself is incapable of containing normal air line pressures. The cup is nested within an outer cup, the two cups together being capable of containing air line pressure. The outer cup is attachable to the lubricator head and supports the petcock fitting. The inner cup is sealed to the outer one adjacent the petcock fitting and is sealed to the lubricator head. The advantages of these structural features are brought out in the detailed description. One form of the invention is shown in the accompanying drawings.

FIG. 1 is generally an elevational view of a lubricator using the cup of the present invention, parts being broken away and shown in section.

FIG. 2 is a sectional view on line 2—2 of FIG. 1.

FIG. 3 is a fragmentary generally elevational view of the outer cup by itself.

FIG. 4 is a fragmentary generally elevational view of the inner cup by itself.

Shown in the drawings is a lubricator 10 having a head 12 with a through passage (not shown) extending between an inlet 14 and an outlet 16 adapted for connection to conduits 18 and 20 respectively in an air line system. A cup structure 22 according to this invention is detachably secured to head 12 and is adapted to contain a quantity of lubricant not shown.

As in conventional structures, the interior of lubricator cup 22 is subjected to air line pressure and head 12 incorporates apparatus for transferring lubricant from the cup into the air stream flowing through conduit 18, head 12, and conduit 20. This apparatus forms no part of the present invention. Parts of it are represented by a riser tube 24 and a sintered metal wick 26 projecting downwardly from head 12 into the cup interior. Head 12 has a plug 28 which can be removed for filling cup 22 with lubricant.

Cup 22 comprises an outer cup 30 inside of which is nested an inner cup 32. The inner cup is formed of a tough, flexible, fluid-impervious and preferably transparent or translucent plastic material such as a polycarbonate or nylon. This material is so thin that by itself it is not capable of containing normal air line pressures. Typically, the material is about .060″ thick. The outer cup is also formed of a relatively thin material such as aluminum or a tough plastic such as that known commercially as Delrin, a product of E. I. du Pont de Nemours & Co. Outer cup 30 provides exterior support for inner cup 32, and the two cups together have adequate strength to contain normal air line pressures.

The cups have openings 34, 36 in their respective bottom walls 38, 40, and these openings are aligned when the cups are in nested relation. Opening 36 has a threaded portion 42 into which a petcock fitting 44 is threaded. Fitting 44 has an end portion 46 which projects into the interior of cup 32. Cup 32 has an annular projection 48 spaced outwardly from opening 34, and the angular conformation 50 defined thereby cooperates with a shoulder 52 on the fitting to provide a recess which contains an O-ring 54 forming a seal for containing lubricant in cup 32. Fitting 44 has a through passageway 56 communicating to the interior of cup 32 and being normally closed by petcock 58.

End portion 46 of the fitting is restrained against withdrawal through opening 44 by means of a hairpin-shaped spring 60 having legs 62 which resiliently engage within a groove (not shown) in fitting portion 46. Spring 60 is provided with an upstanding portion forming a finger hold 64 so that the spring can be detached from its groove to release the petcock fitting for withdrawal from cup 32, thereby facilitating disassembly of the cups. To re-assemble the cups, fitting portion 46 is again inserted through opening 34 and the spring replaced.

Outer cup 30 preferably has a circumferential alternate series of ribs 66 and thinner interconnecting web portions 68. The ribs and webs extend longitudinally from the top portion 70 of the cup to bottom wall 40 and webs 68 have elongate openings 72 facilitating visual inspection of the lubricant level in cup 32 and in some cases parts of the lubricant-transferring apparatus supported by head 12.

Upper end portion 70 of outer cup 30 is provided with means adapted to be detachably secured to head 12 and for this purpose is illustrated as being provided with threads 74 adjacent the upper ends of ribs 66 for engagement within a threaded ring 76 depending from head 12. Cup 30 thus supports inner cup 32 when the lubricator is in assembled condition as shown in FIG. 1. Inner cup 32 is adapted to be sealed relative to head 12 for containing air pressure in the assembly. For this purpose, cup 32 is illustrated as having an upper wall portion 78 which extends beyond upper portion 70 of the outer cup for engagement with a surrounding O-ring 80 carried by ring 76.

In use, the interior of cup 32 will usually be subjected to pressures ranging from as low as 60 p.s.i. up to about 150 p.s.i. Inner cup 32 has such thin walls that by itself it could not contain these pressures. It expands outwardly into engagement with cup 30. However, cups 30 and 32 together are adequate to retain these pressures. Moreover, outer cup 30 provides external support which holds inner cup 32 upwardly in the FIG. 1 position with the outer surface of its upper side wall 78 in sealing engagement with O-ring 80.

If, for any reason, the wall structure of composite cup 22 should weaken during the course of its use, the inner plastic cup merely bulges outward either through an opening 72 or through a weak spot in the material forming cup 30, if there is one, until the resulting bulge or balloon bursts. In this bursting, there is no fragmentation because of the inherent nature of the plastic forming cup 32. The composite cup remains integral. Consequently, there is no danger of injury to personnel or damage to equipment through fragmentation. Moreover, such a failure is usually gradual, the bulging being visible often for long enough to facilitate replacement of the failing part before it bursts.

Petcock fitting 44 is attached to outer cup 30 rather than the pressure-containing cup so that it makes no difference whether there is a seal between the petcock fitting and threaded opening 42. The seal is provided at O-ring 54, and if this should fail, it is easily remedied by replacement of the O-ring or whatever associated part is defective.

Outer cup 30 is relatively inexpensive and the thin wall structure of inner cup 32 utilized a relatively small quantity of plastic material. The composite cup structure is less expensive than the conventional thick walled plastic cups. Moreover, since composite cups 22 do not fragment upon failure, they do not need to be provided with protective shields for safety purposes as do conventional cups.

Composite cup 22 is not limited to a rounded or spherical shape in its lower end portions as are conventional plastic cups, but to the contrary can have the more cylindrical configuration shown in FIG. 1. Also, the combined thickness of cups 30 and 32 is less than that of the conventional plastic cup. As a result, a cup according to this invention having about the same diameter of a conventional cup has about twice the lubricant-carrying capacity.

We claim:

1. Cup structure for an air line accessory such as a lubricator comprising,
   two cups, one nested within the other, the inner cup being formed of a relatively tough, flexible, fluid-impervious plastic material,
   said material being so thin that of itself it is incapable of containing air under line pressure, and under the influence of said pressure expands against the outer cup,
   said outer cup being formed of a relatively thin material and providing external support for said inner cup,
   said cups together having strength adequate to contain air under line pressure in said inner cup,
   said cups having aligned wall openings,
   a petcock fitting secured within the wall opening of said outer cup,
   said fitting having a passageway communicating with the interior of the inner cup and being closed by a petcock member,
   means providing a seal disposed between portions of said fitting and portions of said inner cup for containing fluid under pressure in said inner cup,
   said outer cup having means adapted to be detachably secured to the head of an air line accessory,
   said inner cup having means adapted to be disposed in sealing relation to the head of an accessory to which said outer cup is adapted to be secured,
   said outer cup having around its periphery alternately arranged ribs and elongate openings which extend in a direction axial of the cup, said openings being dimensioned so that said material of said inner cup is of itself capable of containing fluid under line pressure in the spans of said openings.

2. Cup structure for an air line accessory such as a lubricator comprising,
   two cups, one nested within the other, the inner cup being formed of a relatively tough, flexible, fluid-impervious plastic material,
   said material being so thin that of itself it is incapable of containing air under line pressure, and under the influence of said pressure expands against the outer cup,
   said outer cup being formed of a relatively thin material and providing external support for said inner cup,
   said cups together having strength adequate to contain air under line pressure in said inner cup,
   said cups having aligned wall openings,
   a petcock fitting secured within the wall opening of said outer cup,
   said fitting having a passageway communicating with the interior of the inner cup and being closed by a petcock member,
   means providing a seal disposed between portions of said fitting and portions of said inner cup for containing fluid under pressure in said inner cup,
   said outer cup having means adapted to be detachably secured to the head of an air line accessory,
   said inner cup having means adapted to be disposed in sealing relation to the head of an accessory to which said outer cup is adapted to be secured,
   said outer cup having a sight opening therein, said opening being dimensioned so that said material of said inner cup is of itself capable of containing fluid under line pressure in the span of said opening.

References Cited by the Examiner

UNITED STATES PATENTS

| 240,688 | 4/81 | Frey | 215—12 |
| 1,389,754 | 9/21 | Hale | 85—8.8 XR |
| 1,750,070 | 3/30 | Tuttle | 184—55 |
| 2,756,105 | 7/56 | Magill | 222—394 |
| 2,767,807 | 10/56 | Booth | 184—55 |
| 2,769,445 | 11/56 | Morgavi | 184—55 |
| 2,941,689 | 6/60 | Black | 220—63 |
| 3,098,578 | 7/63 | Rudelick | 220—63 XR |

LAVERNE D. GEIGER, *Primary Examiner.*

MILTON KAUFMAN, *Examiner.*